(No Model.)
H. F. FULLER.
ACETYLENE GAS GENERATOR.
No. 584,931. Patented June 22, 1897.
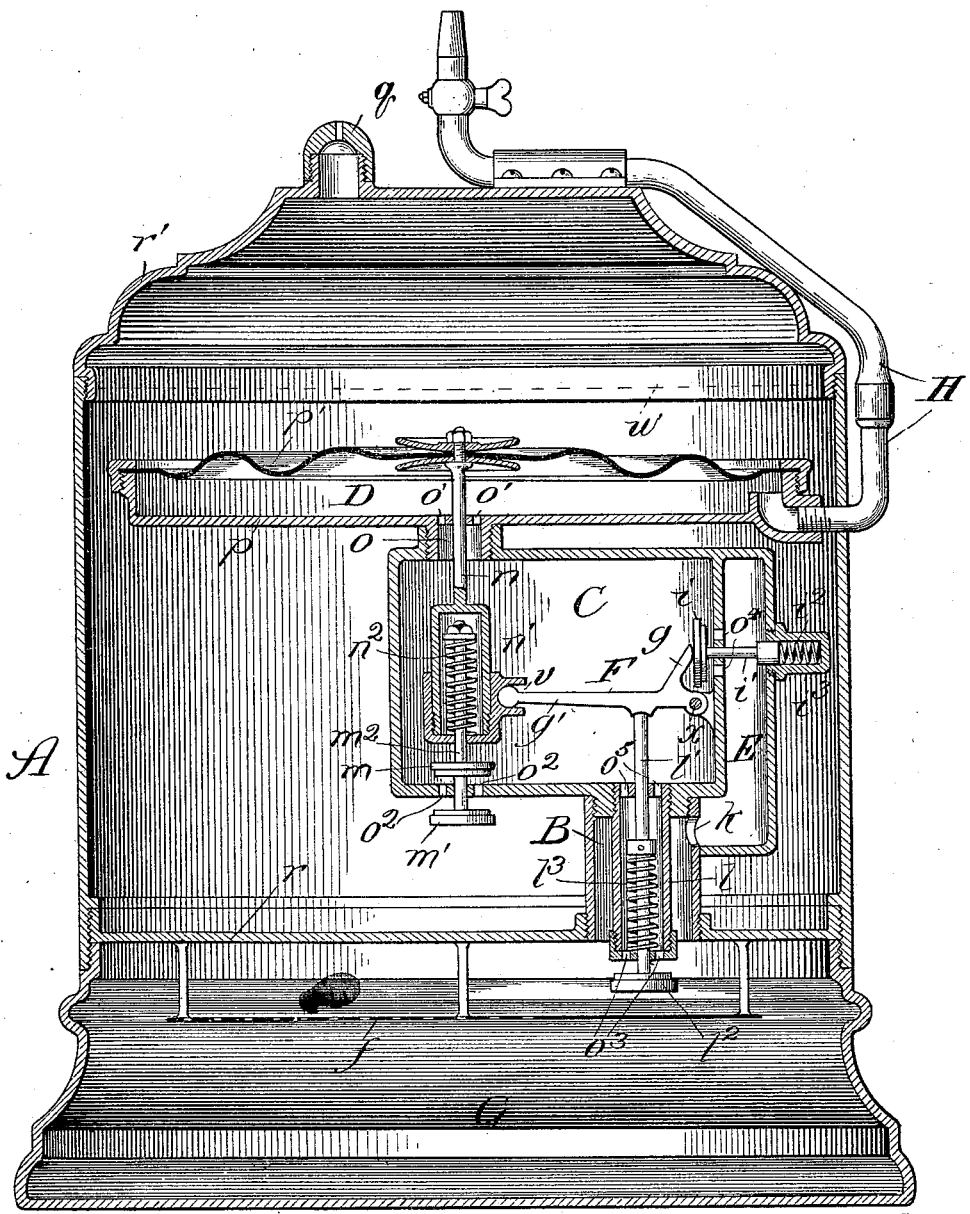
Witnesses:
Inventor:
Henry F. Fuller,
By Dyrenforth & Dyrenforth,
Attys.

UNITED STATES PATENT OFFICE.

HENRY F. FULLER, OF CHICAGO, ILLINOIS, ASSIGNOR TO THE WALMSLEY, FULLER & COMPANY, OF SAME PLACE.

ACETYLENE-GAS GENERATOR.

SPECIFICATION forming part of Letters Patent No. 584,931, dated June 22, 1897.

Application filed December 28, 1896. Serial No. 617,269. (No model.)

*To all whom it may concern:*

Be it known that I, HENRY F. FULLER, a citizen of the United States, residing at Chicago, in the county of Cook and State of Illinois, have invented a new and useful Improvement in Gas-Generators, of which the following is a specification.

My invention relates to an improvement in the class of generators in which the gas is generated by contact of a liquid and solid substance having a gas-generating chemical action on each other and in which provision is made for automatically controlling the generation, to maintain a predetermined pressure in the generator by utilizing such pressure to separate the liquid and solid substances to check the generation when occasion arises for checking it.

While my invention is adapted for use in generating gas from different varieties of solid substances and liquid, I have especially devised it for generating acetylene gas from calcium carbid and water, and therefore and for the sake of convenience I confine the description of my improvement hereinafter contained to its function as a generator of acetylene gas. Moreover, although the generator may be constructed of any size suitable for making gas in any desired quantity, either for storage or for immediate use of the gas, in which latter case the generation is controlled to correspond with the consumption, I intend my improvement more particularly for use as a lamp, including a bicycle-lamp and a headlight, adapted to consume the gas as fast as it is generated and to check the generation when consumption ceases.

The accompanying drawing shows my improved generator by a view in sectional elevation.

A is a chamber, preferably of cylindrical form, having a bottom $r$, which may be screwed into place, as shown, and a top $r'$, also shown to be separably connected with the shell forming the chamber, and which should be provided with a suitable vent $q$. Within the chamber A there is supported in an opening in the bottom $r$ a tubular chamber B, carrying at its upper end a larger chamber C, in the top of which is an opening $o$, in which is connected a diaphragm-chamber D, comprising a rigid cup-shaped base $p$, having as its cover an elastic diaphragm $p'$, formed, preferably, of corrugated sheet metal and hermetically fastened about its edge to the base $p$. From the center of the diaphragm $p'$ there depends through the opening $o$, the top of which is closed except for one or more small openings $o'$ in its covering means, a stem $n$, on which is provided a housing $n'$ for a spring $n^2$, confined between the base of the housing and the upper end of a valve-stem $m^2$, which extends through the bottom of the housing, as also through the bottom of the chamber C between small openings $o^2$ therein, and at opposite sides of which it carries the valve-heads $m$ and $m'$.

In the chamber B, which communicates from its upper end with the chamber C through one or more openings $o^5$, is suspended a cylinder $l$, having one or more openings $o^8$ in its base, through which latter there extends a stem $l'$, carrying a valve-head $l^2$ on its lower end and having confined about it in the cylinder a spring $l^3$, tending to seat the valve against the openings $o^3$. From an opening $k$ in the side of the cylinder $l$ there extends a passage E, from which communication is had with the chamber C through one or more openings $o^4$, controlled by a valve or valve-head $i$ on a stem $i'$, held against a spring $i^2$, confined in a housing $i^3$, extending from the side of the passage E. A lever F, of approximately bell-crank shape, is fulcrumed at $x$ in the chamber C, to bear at one arm, $g$, against the valve $i$, in opposition to the spring $i^2$, and extend with its other arm $g'$, across the stem $l'$, which is fastened to it, into engagement by a ball-and-socket connection at $v$ with the housing $n'$.

G is a cup-shaped bottom removably fastened to the base of the chamber A and affording a carbid-holder or generating-chamber, in the upper portion of which is supported a perforated water-distributing plate $f$, which extends underneath the cylinder $l$.

A gas-outlet pipe H leads from the diaphragm-chamber D to any desired point and is shown to be extended to the top of the generator, where it terminates in a burner.

In the condition of the apparatus when in disuse the valve $m$ seats against the openings $o^2$ to close the chamber C to the water-containing chamber A, the water-level in which is indicated at $w$.

The supply of calcium carbid is introduced into the holder G, which is then screwed into place, preferably, however, after a few drops of moisture have been introduced upon it to start, preliminarily, the generation of gas. The gas thus preliminarily generated rises into the diaphragm-chamber D through the chamber B, passage E, and chamber C, interposed between the chambers A and D; and when the gas-pressure in the diaphragm-chamber has sufficiently distended the diaphragm to cause it to lift the valve $m$ water from the chamber A will enter through the openings $o^2$ into the chamber C and pass thence through the chamber B, dropping from the openings $o^3$ in the base of the latter upon the plate $f$, upon which it spreads and drops through its perforations upon the carbid-supply in the holder G. The gas thus evolved reaches the diaphragm-chamber by the course already described, and the quantity generated is enough to supply the burner or outlet H and accumulate a pressure in the chamber D sufficient to distend the diaphragm $p'$ to the extent of causing it to raise the valve $m'$ against its seat at the openings $o^2$, thereby closing the chamber C to the water-supply until the pressure in the diaphragm-chamber is reduced by the gas-discharge from it through the pipe H and the exhaustion of the water-supply in the generating-chamber G sufficiently to cause the diaphragm to subside and thereby open the valve $m'$ to admit more water into the carbid-holder G.

In the operation of the apparatus the gas-pressure generated therein may at times be sufficient to distend the diaphragm to the extent of causing the rise of the stem $n$ and housing $n'$ not only to close the valve $m'$, but also the valve $l^2$ by turning the lever F to raise the stem $l'$ sufficiently for the purpose, whereby also the valve $i$ will be closed, thus shutting off the supply at the inlets $o^3$ and $o^4$ from the chamber G to the diaphragm-chamber until reduction of pressure in the latter shall again open the valves $i$ and $l^2$ without opening at the same time the valve $m'$.

Among the more salient features of advantage to be noted as being afforded by my improvement the following may be mentioned: The diaphragm, which is immersed in the liquid contents of the chamber A and is therefore maintained in a cool condition, affords a condenser for the liquid carried by the gas which enters the diaphragm-chamber, and the water of condensation by trickling down through the chambers C and B upon the plate $f$ and thence entering the generating-chamber G supplements the water-supply in the chamber A and prolongs the action of the supply thereof, thus reducing the frequency of the intervals at which it becomes necessary to attend to replenishing the supply. Moreover, the entire valve system of the apparatus is under the control of the one diaphragm, the valves $m'$, $l^2$, and $i$ being adapted to be closed in succession by its distention and to be opened in the reverse order of succession by deflation of the diaphragm-chamber. It will further be noticed that with the vent $q$ closed, as it would be normally, the generator may be capsized or even turned upside down without danger of escape of gas or of exposing the carbid to the water or of impairing the light at the burner; also that the apparatus may be readily taken apart, as for cleaning, by merely unscrewing the parts.

What I claim as new, and desire to secure by Letters Patent, is—

1. In a gas-generator, the combination of a liquid-chamber and a generating-chamber, a diaphragm-chamber in said liquid-chamber having an outlet and valve mechanism controlling communication between the said chambers, said diaphragm-chamber forming a condenser, substantially as described.

2. In a gas-generator, the combination of a liquid-chamber and a generating-chamber, a diaphragm-chamber in said liquid-chamber, having an outlet, a chamber in said liquid-chamber interposed between it and the generating-chamber and having a valve device controlling communication between said interposed and liquid chambers and operatively connected with the diaphragm, and a valve device between said interposed and generating chambers, operatively connected with said diaphragm, substantially as described.

3. In a gas-generator, the combination of a liquid-chamber and a generating-chamber, a diaphragm-chamber in said liquid-chamber having an outlet, a chamber in said liquid-chamber interposed between it and the generating-chamber and having a valve device controlling communication between said interposed and liquid chambers and operatively connected with the diaphragm, a valve device between said interposed and generating chambers, operatively connected with said diaphragm and having a by-passage leading from it into said interposed chamber, and a valve device in said by-passage controlled by the diaphragm, substantially as described.

4. In a gas-generator, the combination of a liquid-chamber and a generating-chamber, a diaphragm-chamber in said liquid-chamber, having an outlet, a chamber in said liquid-chamber interposed between it and the generating-chamber and having a valve device controlling communication between said interposed and liquid chambers and operatively connected with the diaphragm, a valve device between said interposed and generating chambers, operatively connected with said diaphragm, and a perforated distributing-plate in the generating-chamber, substantially as described.

5. In a gas-generator, the combination of a liquid-chamber A, a generating-chamber G, a chamber B rising from the liquid-chamber and carrying a chamber C surmounted by a diaphragm-chamber D having an outlet, valves $m$ and $m'$ suspended from the diaphragm and controlling communication between the chambers A and C, and a valve device in the chamber B controlling communication between the chambers B and C, and a lever connecting the stem of said valve device with the valves $m$, $m'$, substantially as described.

6. In a gas-generator, the combination of a liquid-chamber A, a generating-chamber G, a chamber B rising from the liquid-chamber and carrying a chamber C surmounted by a diaphragm-chamber D having an outlet, valves $m$ and $m'$ suspended from the diaphragm and controlling communication between the chambers A and C, a valve device in the chamber B controlling communication between the chambers G and C, a passage E connecting the chambers B and C and provided with a valve $i$, and a lever F connected with the valves $m$, $m'$ and engaging the valve device in the chamber B and the valve $i$, substantially as described.

7. A gas-generator comprising, in combination, a liquid-chamber A surmounting a generating-chamber G and containing the intercommunicating chambers B and C and the diaphragm-chamber D composed of a base $p$ covered by a diaphragm $p'$ and provided with an outlet H, valves $m$ and $m'$ at an opening in the base of the chamber C and carried by a spring-controlled stem $m^2$ in a housing $n'$ suspended from the diaphragm, a lever F in the chamber C engaging at one arm with said housing and with the stem of said valve device, and a passage E connecting the chambers B and C and provided with a valve $i$ engaged by an arm $g$ of said lever, substantially as described.

HENRY F. FULLER.

In presence of—
  J. H. LEE,
  R. T. SPENCER.